June 17, 1930.  F. J. B. BERRY  1,765,296
BORING MACHINE
Original Filed Nov. 29, 1926
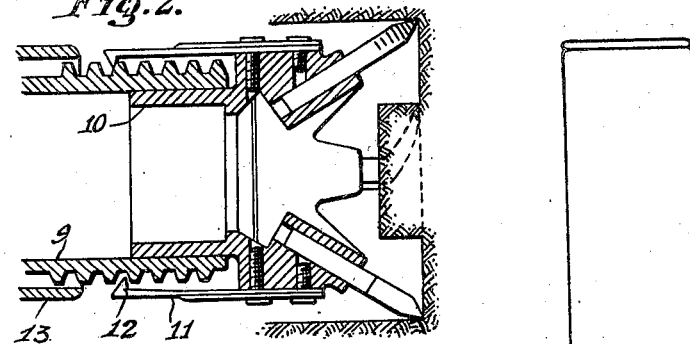
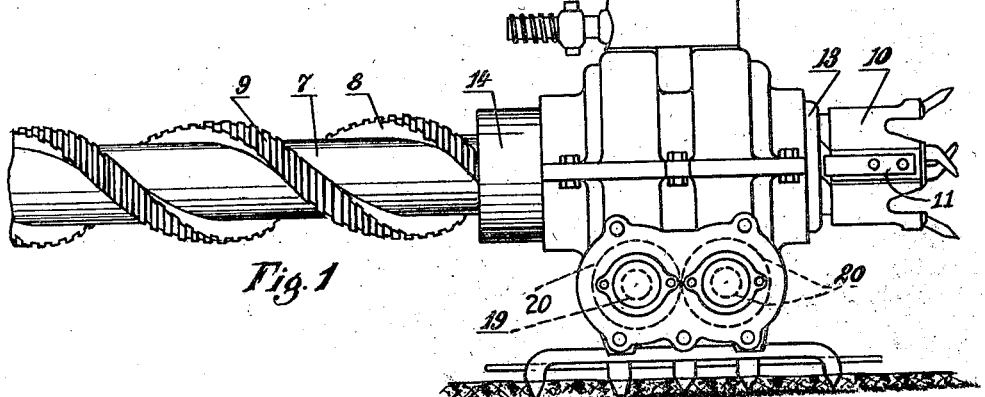
Inventor:
François J. B. Berry,
by Emil Bonnelycke
Attorney Patented June 17, 1930

1,765,296

UNITED STATES PATENT OFFICE

FRANCOIS JACQUES BARTHELEMY BERRY, OF LILLE, NORD, FRANCE

BORING MACHINE

Original application filed November 29, 1926, Serial No. 151,512, and in France June 21, 1926. Divided and this application filed August 8, 1928. Serial No. 298,277.

This invention relates to machines for cutting or drilling holes of fairly large size in coal or rock, so as to enable the same to be broken down subsequently with facility by the use of a hammer or other suitable means. More particularly, however, the invention involves a special form of tool head which can be readily and quickly removed from and reattached to the tool shaft when it is desired, for any reason, to change any one or more of the cutters.

In the accompanying drawing:

Figure 1 is a side elevation of a boring or drilling machine equipped with the improved tool head; and Fig. 2 is an enlarged sectional view of the tool head itself.

The construction shown in said drawing represents one form of machine in which the present invention may be utilized, though the invention manifestly can be applied to other and different types of boring machines, so that no limitation thereto is contemplated. Such construction, in fact, is that shown, described and claimed in my prior application No. 151,512, filed November 29, 1926, of which the present case is a division.

The machine illustrated embodies essentially a rotary driving bar 7 provided with a helical rib 8 of large pitch that extends around its periphery; the outer edge face of the bar carrying a screw thread 9 of comparatively small pitch. This bar 7 constitutes the auger shaft of the machine, and it is rotated in and, at the same time, advanced through two sleeves 13 and 14, wherethrough it extends, by means of suitable driving mechanism (preferably that described and claimed in my prior application, above identified) which is diagramatically indicated as a whole at 20 in Fig. 1.

The tool head 10, which presents the important features of the invention, as has already been stated, is located at the front end of the shaft or bar 7, where it is detachably mounted. As shown in Fig. 2, the head is hollow and it is formed with a stem or neck which extends rearwardly from it and fits in the front end of the shaft or bar, which is likewise hollow; the arrangement being such that the tools which it carries will cut into the face of the coal or rock, forming an annular hole around a central core that can ultimately be discharged through the bore of the shaft as the latter is fed forward. There may, of course, be any desired number of tools, which may themselves be of any suitable or preferred type; but in any case, the tools are detachably mounted in the sockets provided for them in the head.

To maintain the detachable tool head in position at the end of the shaft or bar, said head is provided with a plurality of catches in the form of resilient leaves or straps 11 that are fastened by screws or the like to the external side wall of the head and extend rearwardly in longitudinal direction across the threads 9 on the outer edge face of the rib 8. The rear ends of the straps are formed with pointed noses or teeth 12 that are designed to engage in the spaces between adjacent threads 9. Hence, by screwing the tool head in one direction on the auger shaft, it can easily be brought into working position thereon, and it can be removed with equal readiness by screwing it in the opposite direction.

When the hole has been bored to the proper depth, the auger shaft is moved backward to its original position in the manner described in the prior application; and should the tool head 10 come into contact with the sleeve 13 due to faulty operation, the catches 12 will be moved automatically out of engagement with threads 9, thereby freeing the head completely before any accident can happen. In this event, the auger shaft will be finally released from the sleeve 13, but no damage will result.

I claim as my invention:—

1. In a boring machine, an auger shaft formed with an external helical rib having its outer edge face toothed, a tool head at the front end of said shaft, and catches engaged with the teeth of said rib to detachably secure the tool head to the shaft.

2. A boring machine, according to claim 1, in which the catches are made of flexible metal and are automatically moved out of engagement with the rib threads during a backward movement of the auger shaft.

In testimony whereof, I affix my signature.

FRANCOIS JACQUES BARTHELEMY BERRY.